Jan. 26, 1965  J. M. JACKSON ETAL  3,166,928
ELECTRICAL AUTOMATIC DEW POINT HYGROMETER
Filed June 28, 1961  2 Sheets-Sheet 1

Justin M. Jackson INVENTORS
Kazuyuki R. Ono
William J. Superior
Charles W. Thornthwaite BY Louis Sheldon
ATTORNEY

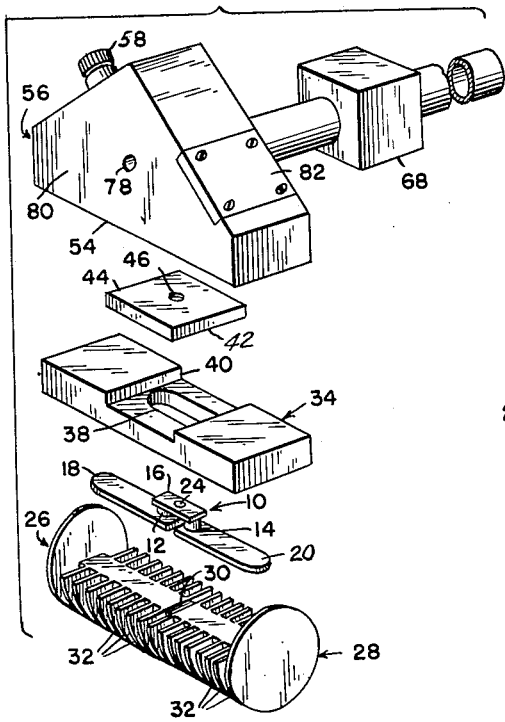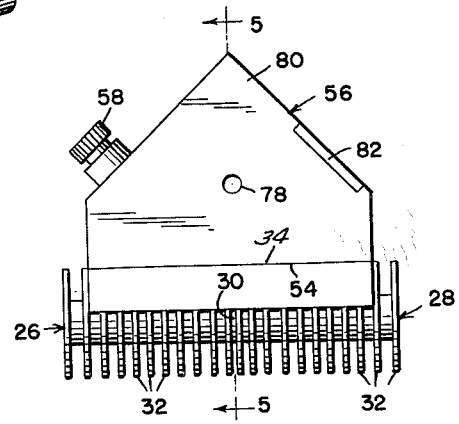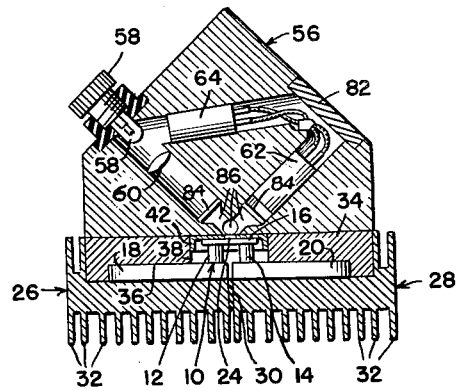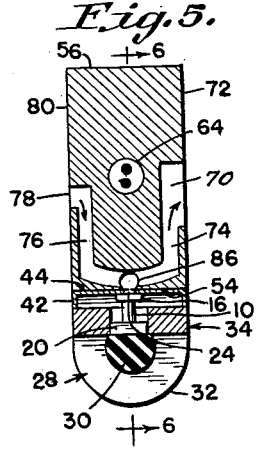

United States Patent Office 3,166,928
Patented Jan. 26, 1965

3,166,928
ELECTRICAL AUTOMATIC DEW POINT HYGROMETER
Justin M. Jackson and Kazuyuki R. Ono, Bridgeton, William J. Superior, Seabrook, and Charles W. Thornthwaite, Elmer, N.J., assignors, by mesne assignments, to the United States of America as represented by the Secretary of the Navy
Filed June 28, 1961, Ser. No. 120,448
11 Claims. (Cl. 73—17)

This invention relates to an apparatus for determining the dewpoints of gases, and is concerned more particularly with those employing the mirror-fogging principle.

An object of the invention is to provide an improved apparatus for ascertaining and indicating the moisture concentration in a gas.

Another object is to provide a more efficient apparatus for bringing a light-reflector to and maintaining it at the dewpoint of a gas sample in contact with the reflector.

A further object is to provide dewpoint determining apparatus wherein the ambient atmospheric temperature is utilized to promote efficiency of cooling and heating of a reflector to be fogged by the gas sample.

An additional object is to provide ways and means for automatically heating or cooling the reflector, as conditions demand, irrespective of the magnitude and sign of the difference between the reflector temperature and the dew point of the gas sample as the latter comes into contact with the reflector, to instantaneously bring the reflector to and maintain it at the dew point of the gas in contact therewith.

It is also an object to provide ways and means for compensating for slight fluctuations in the intensity of light from the light source and in the temperature of the atmosphere ambient to the heat pump.

Another object is to provide ways and means for instantaneously and automatically obtaining a running account of the dewpoints of successive portions of gas.

A further object is to provide ways and means enabling the dewpoint of a gas sample to be determined at the point in space under investigation.

Further objects and advantages of the invention will appear as the description proceeds.

The invention will be better understood on reference to the following description and the accompanying drawing, wherein:

FIG. 3 is an exploded view of the sensor unit of the apparatus.

FIG. 4 is an elevational view of the sensor unit.

FIG. 5 is a view, partly in elevation, taken as indicated at 5—5 in FIG. 4.

FIG. 6 is a view, partly in elevation, taken as indicated at 6—6 in FIG. 5.

Figure 1:
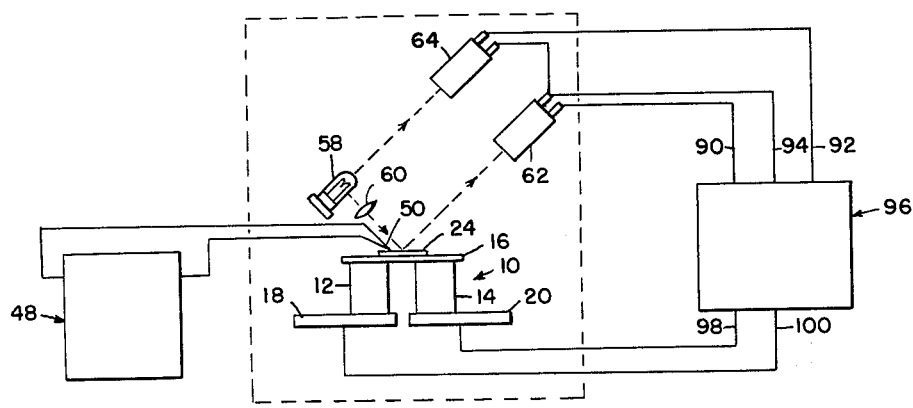
FIG. 1 is a schematic diagram illustrating an apparatus embodying the invention.

Referring now more particularly to the drawing, disclosing an illustrative embodiment of the invention, there is shown at 10 a thermoelectric heat pump including a thermocouple comprising two semiconductors 12 and 14 of high (5%–10%) thermal electric conversion efficiency, such as bismuth-telluride semiconductors, one being a P type semiconductor and the other being an N type semiconductor, each soldered at one end to a bus bar 16 and at the other end respectively to two spaced heavy copper or other suitable heat-dissipating rods 18 and 20.

A metallic mirror 24 of good thermal conductivity is bonded in good thermal contact to the bus bar 16. The mirror may be a silvered surface on the bus bar, and the bus bar is preferably thin for rapid heat transfer.

The rods 18 and 20 are bonded with good thermal contact to spaced metal bodies 26 and 28 of good thermal conductivity, such as aluminum, the bodies being spaced apart by insulation 30 and having heat-dissipating fins 32 and being exposed to the ambient atmosphere.

A plastic or other suitable non-conductor base 34 is seated on and bonded or otherwise secured to the bodies 26 and 28 and has in its seated face a recess 36 snugly receiving the rods 18 and 20. The base 34 has a hole 38 accommodating the semiconductors 12 and 14, and a slot 40 in its upper face to receive the bus bar 16. A masking plate 42 of nonconducting material and having a matte black outer surface 44 is seated on the floor of and suitably secured in the slot 40 and masks the bus bar 16 but has a hole 46 to expose only the surface of the mirror 24.

A temperature recorder 48 (FIG. 1) is provided, including a temperature sensor 50, such as a thermister bead or thermocouple junction, soldered to or embedded in the mirror 24 just beneath its surface.

The base 34 is suitably secured light-tight to the bottom 54 of a block 56 machined to accommodate an electric light bulb 58, a lens 60, and photocells 62 and 64, in such relation to one another and to the mirror 24 that a light beam from the bulb passes through the lens, strikes the mirror, and is reflected thereby to the photocell 62, and another light beam from the bulb bypasses the lens, mirror, and photocell 62 and strikes the photocell 64. A suction pump 68 is connected to an opening 70 in a side 72 of the block 56, which has an angled passage 74 leading from the opening to the mirror 24 and an angled passage 76 leading from an inlet 78 at the other side 80 of the block, where the gas sample which is to be tested for dewpoint is drawn from the atmosphere. The block 56 is formed with an access opening and a removable cover 82 therefor. The mirror 24 is shielded against all light except that from the bulb 58. The lens 60 and photocell 62 are shielded as by transparent discs 84 from the gas sample, so that the gas in the block 56 can occupy only the passages 74 and 76 and a chamber or space 86 of extremely small volume adjacent the mirror, and cannot gain access to the thermoelectric heat pump 10.

The photocells 62 and 64 feed as indicated at 90, 92, and 94 into a control circuit 96 which, as indicated at 98 and 100, feeds into and controls the thermoelectric heat pump 10 and operates therewith as a servomechanism to heat or cool the mirror 24, as conditions demand, so as to bring the mirror to and maintain it at a temperature which is the dewpoint of the gas sample then in contact with the mirror.

Figure 2:
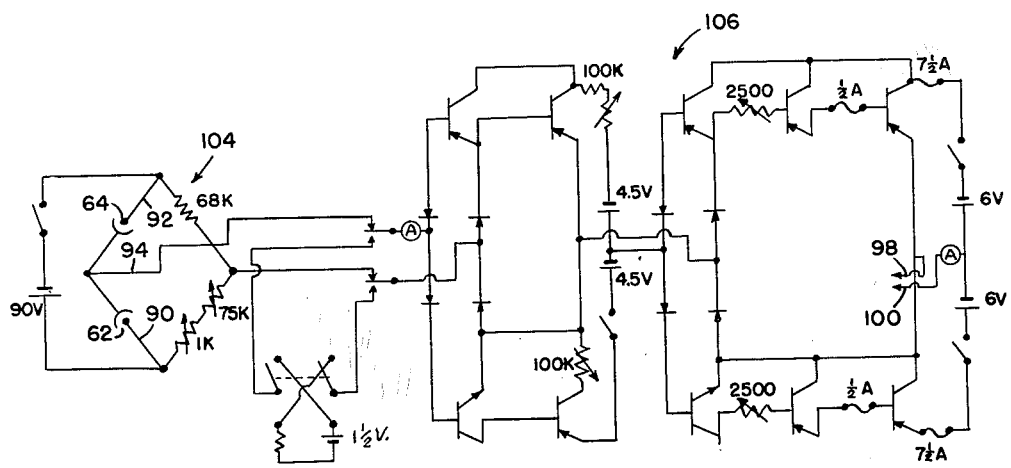
FIG. 2 is a schematic of control circuitry suitable for inclusion in the apparatus.

A control circuit 96 suitable for the purposes of the invention is illustrated in FIG. 2 and comprises a photocell bridge 104 and amplifier 106 providing a current whose polarity and magnitude are automatically and instantaneously adjusted to bring the mirror 24 to and maintain it at the dewpoint of the gas under test. When successive portions of a gas coming in contact with the mirror 24 are at the same dewpoint, the current will be held at a constant and proper level in the cooling direction. Whenever the moisture content of contiguous portions of the sample are abruptly different, then the current will go to the full magnitude and proper direction to instantaneously heat or cool the mirror, as the case may be, to the dewpoint of the gas then contacting the mirror, and again, should the gas thereafter be of constant moisture content, cooling will take place at a reduced steady rate to counteract the normal warming effect of the ambient air.

More specifically, the apparatus being turned on, and an initial gas sample being placed in contact with the mirror 24, then, if the mirror temperature is above the dew point of the sample, so that the mirror is clear or fogged to less than dew point depth, the light reflected to the photocell 62 will be of greater intensity than would be the case if the mirror were fogged to dew point depth, with the result that the control circuit 96 will be influenced to cause flow of full magnitude current through the thermoelectric heat pump 10 in such direction that the bus bar 16 and hence the mirror will be immediately cooled by the Peltier effect. If the mirror 24 at the start is clear, then, when the mirror has been cooled to a level at which droplets of moisture begin to condense on it from the sample, the droplets will reduce the intensity of reflected light striking the photocell 62, so that current will continue to flow in the same direction and hence the rapid cooling of the mirror will continue, the mirror will become progressively more fogged and thus the intensity of light reflected to the photocell 62 will be progressively reduced. When the mirror temperature reaches the dew point of the sample, the depth of fogging is such that the intensity of the reflected light received by the photocell 62 is in a predetermined ratio to the intensity of light received by the photocell 64, and then the control circuit will supply a cooling current at a reduced steady magnitude just sufficient to maintain the mirror at the dew point if succeeding portions of the sample have the same moisture content.

If the next sample is above its dew point and has a lower dew point than the preceding sample, the new sample will momentarily defog or reduce the depth of the fog on the mirror 24, and the resulting increase in intensity or reflectivity will operate as is apparent from the foregoing to cause full magnitude cooling of the mirror to instantaneously bring it to the dew point of the new sample.

If now a sample having a higher dew point comes into contact with the mirror 24, the depth of fogging on the mirror will exceed the dew point depth, so that the intensity of reflected light will be so low that full magnitude current will flow through the thermoelectric heat pump 10 in the direction to heat the mirror, with the result that the depth of fogging on the mirror is progressively reduced. When the depth of fogging has diminished to such an extent that the photocell 62 is illuminated to the predetermined extent, the mirror is then at the dew point of the sample, and, if succeeding portions of the gas coming into contact with the mirror are of the same moisture content, the control circuit will operate to provide a cooling current at a reduced stabilized rate just sufficient to counteract the normal warming effect of the ambient air as noted above.

Gas samples may be introduced and tested at spaced intervals pursuant to intermittent operation of the pump 68, or gas may be made to flow uninterruptedly over the mirror 24 and a running dew point record made of successive portions of the flowing gas. The rate of cooling or heating, as the occasion demands, is constant and at full magnitude so long as the mirror 24 is not at the dew point of the gas in contact therewith, and the rate is such that the difference is made up instantaneously for all practical purposes. Thus the mirror temperature is in effect automatically held at the dew point of each succeeding portion of gas in contact with the mirror, and the successive dew points are read out by the recorder 48.

The bus bar 16 is preferably thin to rapidly bring the mirror 24 to the bus bar temperature. The rods 18 and 20 and the finned heat dissipators 26 and 28 operate to maintain the ends of the semiconductors 12 and 14 remote from the bus bar 16 substantially at the ambient atmospheric temperature.

The photocell 64, being excited directly by the lamp 58, operates to adjust the output of the photocell bridge 104 so as to compensate for changes in light intensity and changes in the internal resistance of the photocell 62 which can take place when mirror fluctuations in lamp voltage and ambient temperature occur.

The pump 10, using as it does the Peltier effect, supplies heat to or extracts heat from the mirror 24 at a speed which for practical purposes may be regarded as instantaneous, and the dew points are likewise instantaneously recorded. The Peltier rate of heating and cooling is some 20 times as rapid as where the Joule effect is relied upon. Thus there is substantially no time lag, so that gas samples intermittently pumped to or otherwise brought into contact intermittently with the mirror can be tested in rapid succession, and, where spaced or contiguous parts of an atmosphere flow past the mirror, regardless whether the mirror is stationary, or the atmosphere is stationary and the mirror is moving, the dew point will be recorded practically contemporaneously with the contact of the sample with the mirror. This is especially important under high speed flow conditions, where a small time lag would be of relatively great importance and require computation to obtain accurate data.

Should conditions be encountered where the dew point of the gas sample to be tested is at or below the freezing temperature of water, the mirror surface, when at the dew point, will be frosted instead of fogged. In such a case the apparatus will have been calibrated to determine the depth of frosting which will result in the dew point reflectivity, and the apparatus will operate as is evident from the foregoing to record the dew points of successive gas samples in contact with the mirror 24.

The measurement of the relative humidity of air and other gases is important for meteorological observations for weather forecasting and other purposes, including the control of numerous technological processes. Devices widely employed for such measurements use the fogged mirror principle to obtain the dew points of gas samples, and are known as dew point hygrometers. The relative humidity of a gas is the ratio of its vapor pressure at its dew point to the vapor pressure a gas would have if saturated at its actual temperature. Having determined both the actual temperature of a gas and its dew point, then, by reference to a suitable table or graph the relative humidity of the gas can be determined.

It will be apparent from the foregoing that the invention enables the dew points of a gas sample to be obtained instantaneously; the gas is so channeled that it cannot come in contact with and thus cannot affect the efficiency of the heat pump; the only light striking the photocell 62 is that which is reflected by the mirror 24; the only light striking the photocell 64 comes directly from the bulb 58; the ambient atmosphere is utilized to promote the efficiency of cooling and heating of the mirror; the mirror is instantaneously brought to the dew point temperatures of the successive gas samples; operation is independent of changes in the illumination supplied by the light source and of the aging characteristics of the photocells, and insensitive to variations in power supply voltage; the cooling is stabilized at a reduced rate so long as the dew point of the gas being tested is constant; the rate of heating or cooling, as the case may be, abruptly reaches a maximum on any change in gas dew point; the apparatus can be stationary, or it can be carried by any vehicle, and can be used in any environment where gas samples can be tested; and the apparatus is simple, compact, and light in weight.

Obviously many modifications and variations of the invention are possible in the light of the above teachings. It is therefore to be understood that within the scope of the appended claims the invention may be practiced otherwise than as specifically described.

We claim:

1. In an apparatus for obtaining a substantially synchronous running index of the dewpoint of successive portions of a gas sample, a photocell, a light-reflector, a light source, light beams of equal intensity continuously directed from the source toward the photocell and reflector, a photocell receiving light reflected from the reflector, a sample of the gas in contact with the reflector, means including a thermoelectric heat pump affixed to said reflector responsive to any appreciable difference between the ratio of the intensities of light received by the respective photocells and a given ratio which obtains when the reflector is coated to a predetermined depth for bringing the reflector to a temperature at which the reflector is coated to said depth by condensation of moisture from the sample, and means for reading out an index of the temperature of the reflector when said ratios are equal.

2. In an apparatus for obtaining a substantially synchronous running index of the dewpoints of successive portions of a gas, a surface, a gas flowing in contact with and past the surface so that the surface is uninterruptedly in contact with different portions of the gas, means including a thermoelectric heat pump affixed to said surface instantaneously responsive to a difference between the temperature of the surface and the dewpoint of the gas portion in contact with the surface for bringing the temperature of the surface to the dewpoint, and means providing a continuous and contemporaneous index of the dewpoints of such successive portions of the gas.

3. In an apparatus for obtaining a substantially synchronous running index of the dew point of successive portions of a gas sample, a light source, a first photocell and a mirror continuously receiving light from the source, a sample of gas in contact with the mirror, a second photocell connected with the first photocell and continuously receiving light reflected from the mirror, a bridge including the photocells, an amplifier connected to the output of the bridge, a thermoelectric heat pump connected to the output of the amplifier and in good thermal contact with the mirror, the bridge and amplifier being operative through the pump to selectively and instantaneously cool or heat the mirror according as the dew point of the gas is below or above the mirror temperature and bring the mirror to the dew point.

4. In an apparatus for obtaining an index of the dew point of a gas sample, a thermoelectric pump having a juncture of two dissimilar semiconductor elements, a light source, a mirror in good thermal mechanical contact with the juncture of the pump and receiving light from the source, a gas sample in contact with the mirror, means shielding the pump from contact with the sample, means for detecting light reflected by the mirror, means responsive to any difference between the temperature of the mirror and the dew point of the sample for driving the pump in a direction to bring the mirror to the dew point, and means for reading out the mirror temperature when the mirror is at the dew point.

5. In an apparatus for obtaining an index of the dew point of a gas sample, a thermoelectric pump having a juncture of two dissimilar semiconductor elements, a light source, a mirror in good thermal and mechanical contact with the juncture of the pump and receiving light from the source, a gas sample in contact with the mirror, means shielding the pump from contact with the ambient atmosphere, means for detecting light reflected by the mirror, means responsive to any difference between the temperature of the mirror and the dew point of the sample for driving the pump in a direction to bring the mirror to the dew point, and means for reading out the mirror temperature when the mirror is at the dew point.

6. In an apparatus for obtaining an index of the dew point of a gas sample, a thermoelectric pump having a juncture of two dissimilar semiconductor elements, a light source, a mirror in good thermal and mechanical contact with the juncture of the pump and receiving light from the source, a gas sample in contact with the mirror, means shielding the pump from the sample and the ambient atmosphere, heat dissipating means exposed to the ambient atmosphere and in good thermal contact with ends of the pump legs opposite the juncture, means for detecting light reflected by the mirror, means responsive to any difference between the temperature of the mirror and the dew point of the sample for driving the pump in a direction to bring the mirror to the dew point, and means for reading out the mirror temperature when the mirror is at the dew point.

7. In an apparatus for obtaining a substantially synchronous running index of the dew point of successive portions of a gas sample, a P type semiconductor, an N type semiconductor, a bus bar forming a junction with an end of each semiconductor, a mirror in good thermal and mechanical contact with the bus bar, spaced heat-dissipating members exposed to the ambient atmosphere and respectively in good thermal connection with the other ends of the semiconductors, and insulating means cooperating with the members to immovably support the semiconductors, bus bar, and to shield the semiconductors and bus bar from contact with the ambient atmosphere.

8. The structure of claim 7, means for placing a gas sample in contact with the mirror, a light source shining light on the mirror, a photocell arranged to receive reflected light from the mirror, and means responsive to the intensity of light received by the photocell for driving a direct current through the semiconductors in a direction to bring the mirror to the dew point and for driving the current in a direction to cool the mirror to stabilize it at the dew point if succeeding samples have the same dew point.

9. An apparatus for obtaining a substantially synchronous running index of the dew points of successive portions of a gas comprising:
 (1) a housing including
  (a) a light source,
  (b) a first light detector receiving a first light beam from said source,
  (c) a gas passageway,
  (d) a reflector in said passageway,
  (e) a second light detector receiving a second light beam reflected by said reflector from said source,
  (f) means for maintaining said first light beam isolated from said gas passageway;
 (2) a thermoelectric heat pump including,
  (a) a heat conductive member affixed to said reflector,
  (b) a pair of semiconductor elements individually forming junctions with said conductive member,
  (c) a pair of heat dissipating members individually coupled to one of said semiconductor elements;
 (3) circuit means coupled to said detectors and said heat dissipating members for controlling the amount and direction of current flow through said pump for maintaining said reflector at the dew point temperature of a gas in said passageway, and
 (4) means for measuring the temperature of said reflector.

10. The apparatus of claim 9 wherein said circuit means include a bridge circuit having said detectors individually positioned in respective arms of said bridge circuit.

11. The apparatus of claim 9 wherein said circuit means include controls capable of maintaining said reflector at a predetermined temperature with respect to the dew point temperature of the gas sample.

References Cited by the Examiner

UNITED STATES PATENTS

| | | | |
|---|---|---|---|
| 2,268,785 | 1/42 | Thornthwaite | 73—17 |
| 2,459,810 | 1/49 | Graves et al. | 73—17 |
| 2,466,696 | 4/49 | Friswold et al. | 73—17 X |
| 2,624,195 | 1/53 | Van Alen | 73—17 |
| 2,720,107 | 10/55 | McBrair | 73—17 |
| 2,979,950 | 4/61 | Leone | 73—17 X |
| 3,077,763 | 2/63 | Gena et al. | 73—17 |

FOREIGN PATENTS 89,176  10/58  Netherlands.

RICHARD C. QUEISSER, *Primary Examiner.*

ROBERT L. EVANS, DAVID SCHONBERG,
*Examiners.*